United States Patent
Kanno et al.

(10) Patent No.: US 9,309,457 B2
(45) Date of Patent: Apr. 12, 2016

(54) METHOD FOR MANUFACTURING COATED PHOSPHOR, AND COATED PHOSPHOR

(75) Inventors: Masaki Kanno, Tochigi (JP); Takamasa Izawa, Tochigi (JP); Tsuneo Kusunoki, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 88 days.

(21) Appl. No.: 13/978,675

(22) PCT Filed: Jan. 18, 2012

(86) PCT No.: PCT/JP2012/050998
§ 371 (c)(1),
(2), (4) Date: Jul. 17, 2013

(87) PCT Pub. No.: WO2012/099179
PCT Pub. Date: Jul. 26, 2012

(65) Prior Publication Data
US 2013/0292610 A1    Nov. 7, 2013

(30) Foreign Application Priority Data

Jan. 18, 2011  (JP) ................... 2011-008306
Jan. 16, 2012  (JP) ................... 2012-006124

(51) Int. Cl.
*C09K 11/02*  (2006.01)
*C09K 11/77*  (2006.01)

(52) U.S. Cl.
CPC ........... *C09K 11/025* (2013.01); *C09K 11/7734* (2013.01)

(58) Field of Classification Search
CPC .. C09K 11/7734; C09K 11/025; C09K 11/02; C09K 11/08; C09K 11/7728; H01L 33/502; H01L 33/501; Y02B 20/181
USPC ............. 252/301.4 F, 301.4 R; 313/486, 503; 428/403, 690; 427/157, 212
See application file for complete search history.

(56) References Cited

U.S. PATENT DOCUMENTS

2007/0267965 A1    11/2007  Igarashi et al.

FOREIGN PATENT DOCUMENTS

| CN | 101238195 A | 8/2008 |
|---|---|---|
| CN | 101665690 A | 3/2010 |
| EP | 2 554 628 A1 | 2/2013 |
| JP | A-2007-23221 | 2/2007 |
| JP | A-2007-224262 | 9/2007 |
| JP | A-2007-308537 | 11/2007 |
| JP | 2008-111080 A | 5/2008 |
| JP | 2008111080 A * | 5/2008 |
| JP | A-2008-111080 | 5/2008 |
| JP | A-2008-280471 | 11/2008 |
| JP | 2009-132902 A | 6/2009 |
| JP | A-2009-132902 | 6/2009 |
| JP | 2011026535 A * | 2/2011 |
| JP | A-2011-26535 | 2/2011 |
| JP | A-2011-231266 | 11/2011 |

OTHER PUBLICATIONS

International Search Report issued in International Application No. PCT/JP2012/050998 on Apr. 24, 2012 (with translation).
International Preliminary Report on Patentability issued in International Application No. PCT/JP2012/050998 on Apr. 16, 2013 (with translation).
May 13, 2014 Search Report issued in Chinese Application No. 201280014046.8.
May 21, 2014 First Office Action issued in Chinese Application No. 201280014046.8.
Mar. 24, 2015 Second Office Action issued in Chinese Application No. 201280014046.8.
Jun. 5, 2015 Supplementary European Search Report and European Search Opinion issued Jun. 5, 2015.

* cited by examiner

*Primary Examiner* — Matthew E Hoban
*Assistant Examiner* — Lynne Edmondson
(74) *Attorney, Agent, or Firm* — Oliff PLC

(57) ABSTRACT

A process for producing a coated phosphor, namely a phosphor coated with a coating material, which includes a mixing step of mixing a phosphor with a coating material in a solvent to form a mixed fluid and a separation step of separating the mixed fluid into a solid phase and a liquid phase, wherein the phosphor comprises barium (Ba), strontium (Sr), europium (Eu), silicon (Si) and oxygen (O) at an atomic ratio represented by compositional formula (1), and the mass ratio of the phosphor to the coating material is 40:260 to 200:260, $[(Ba_{1-y}Sr_y)_{1-x}Eu_x]_a Si_b O_c$ (1) [wherein a, b, c, x and y satisfy the relationships: $2.7<a<3.3$, $0.9<b<1.1$, $4.5<c<5.5$, $0<x<0.09$ and $0.25<y<0.75$].

12 Claims, 15 Drawing Sheets

METHOD FOR MANUFACTURING COATED PHOSPHOR, AND COATED PHOSPHOR

TECHNICAL FIELD

This invention relates to a method for manufacturing a coated phosphor wherein a phosphor is coated with a costing material, and a coated phosphor. This application claims priority to Japanese Patent application No. 2011-8306, filed on Jan. 18, 2011 and Japanese Patent application No. 2012-6124, filed on Jan. 16, 2011, all of which are incorporated herein by reference.

DESCRIPTION OF THE RELATED ART

Silicate-based oxide phosphors and sulfide phosphors, which are sulfide salts such as CaS and SrS are known as red phosphors, for example. Since these oxide phosphors and sulfide phosphors are easily degraded by moisture, their luminous efficiencies are difficult to he kept in long time. Patent literature (PLT) 1 therefore proposes a technology of coating a sulfide phosphor, which comprises a ZnS-based sulfide salt, with a coating material for preventing degradation thereof caused by moisture.

The silicate-based oxide phosphors, represented by $[(Ba_{1-y}Sr_y)_{1-x}Eu_x]_aSi_bO_c$, for example, and having a luminescence peak within a wavelength range of 600 to 610 nm exhibit excellent luminous efficiency as a fluorescent substance. Contrary to the silicate-based oxide phosphors including bonds between group 2 elements and O (oxygen), the sulfide phosphors comprising ZnS-based sulfide salts include bonds between group 2 elements and S (sulfur). Consequently, the sulfide phosphors comprising ZnS-based sulfide salts having covalent bonds stronger than those of the silicate-based oxide phosphors are hardly degraded even if they are not coated with coating materials.

FIG. 1 is a graph showing emission intensity changing rates of a sulfide phosphor comprising ZnS-based sulfide sail not coated with coating material and a silicate-based oxide phosphor not coated with costing material. The white squares in FIG. 1 represent emission intensity changing rates of the sulfide phosphor. On the other hand, the black squares in FIG. 1 represent emission intensity changing rates of the oxide phosphor.

Consequently, it is not obvious whether the method of PLT 1 wherein a sulfide phosphor comprising ZnS-based sulfide salt is coated with a coating material can prevent degradation caused by moisture and keep luminous efficiency in long time when applied to a silicate-based oxide phosphor.

CITATION LIST

Patent Literatures

PTL 1: Japanese Unexamined Patent Publication No. 2007-23221

SUMMARY OF THE INVENTION

Technical Problem

Having regard to the above, an object of the present invention is to provide a method for manufacturing a coated phosphor capable of keeping luminous efficiency in long time, and a coated phosphor.

Means for Solving the Problem

A method for manufacturing a coated phosphor according to the present invention, in which a phosphor is coated with a costing material comprises: a mixing step of mixing the phosphor with the coating material in a solvent to form a mixed solution: and a separation step of separating the mixed solution into a solid phase and a liquid phase, wherein the phosphor contains barium (Ba), strontium (Sr), europium (Eu), silicon (Si) and oxygen (O) at an atomic ratio represented by compositional formula (1), and the mass ratio of the phosphor to the coating material is 40:260 to 200:260.

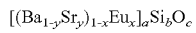

$[(Ba_{1-y}Sr_y)_{1-x}Eu_x]_aSi_bO_c$      compositional formula (1)

wherein a, b, c, x and y satisfy the relationships: $2.7<a<3.3$, $0.9<b<1.1$, $4.5<c<5.5$, $0<x<0.09$ and $0.25<y<0.75$.

A coated phosphor according to the present invention comprises a phosphor and a coating material coating the phosphor, wherein the coated phosphor is obtained by mixing the phosphor with the coating material in a solvent to form a mixed solution and separating the mixed solution into a solid phase arid a liquid phase, the phosphor contains barium (Ba), strontium (Sr), europium (Eu), silicon (Si) and oxygen (O) at an atomic ratio represented by compositional formula (1), and the mass ratio of the phosphor to the coating material is 40:260 to 200:260.

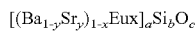

$[(Ba_{1-y}Sr_y)_{1-x}Eu_x]_aSi_bO_c$      compositional formula (1)

wherein a, b, c, x and y satisfy the relationships: $2.7<a<3.3$, $0.9<b<1.1$, $4.5<c<5.5$, $0<x<0.09$ and $0.25<y<0.75$.

A coated phosphor according to the present invention comprises a phosphor and a coating material coating the phosphor, wherein the coated phosphor is obtained by mixing the phosphor with the coating material in a solvent to form a mixed solution and separating the mixed solution into a solid phase and a liquid phase, the phosphor contains barium (Ba), strontium (Sr), europium (Eu), silicon (Si) and oxygen (O) at an atomic ratio represented by compositional formula (1), and the coated phosphor has an electric conductance of 400 ms/m or less when immersed in the solvent.

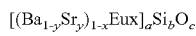

$[(Ba_{1-y}Sr_y)_{1-x}Eu_x]_aSi_bO_c$      compositional formula (1)

wherein a, b, c, x and y satisfy the relationships: $2.7<a<3.3$, $0.9<b<1.1$, $4.5<c<5.5$, $0<x<0.09$ and $0.25<y<0.75$.

Advantageous Effect of the Invention

According to the present invention, a coated phosphor capable of preventing degradation caused by moisture and keeping luminous efficiency in long time can be obtained since the phosphor in the coated phosphor is sufficiently coated with a coating material.

DESCRIPTION OF EMBODIMENTS

Embodiments of the present invention will now be more particularly described with reference to the accompanying drawings.

<Method for Manufacturing a Coated Phosphor>

A method for manufacturing a coated phosphor according to the present invention comprises a mixing step of mixing a phosphor and a coating material within a solvent to obtain a mixed solution, and a separation step of separating the mixed solution into a solid phase and a liquid phase.

The phosphor is a silicate-based oxide phosphor having a luminescence peak within a wavelength range of 600 to 610 nm and comprises barium (Ba), strontium (Sr), europium (Eu), silicon (Si) and oxygen (O) at an atomic ratio represented by the following compositional formula (1).

$$[(Ba_{1-y}Sr_y)_{1-x}Eu_x]_aSi_bO_c \qquad \text{compositional formula (1)}$$

wherein a, b, c, x and y satisfy the relationships: $2.7<a<3.3$, $0.9<b<1.1$, $4.5<c<5.5$, $0<x<0.09$ and $0.25<y<0.75$.

Figure 1:
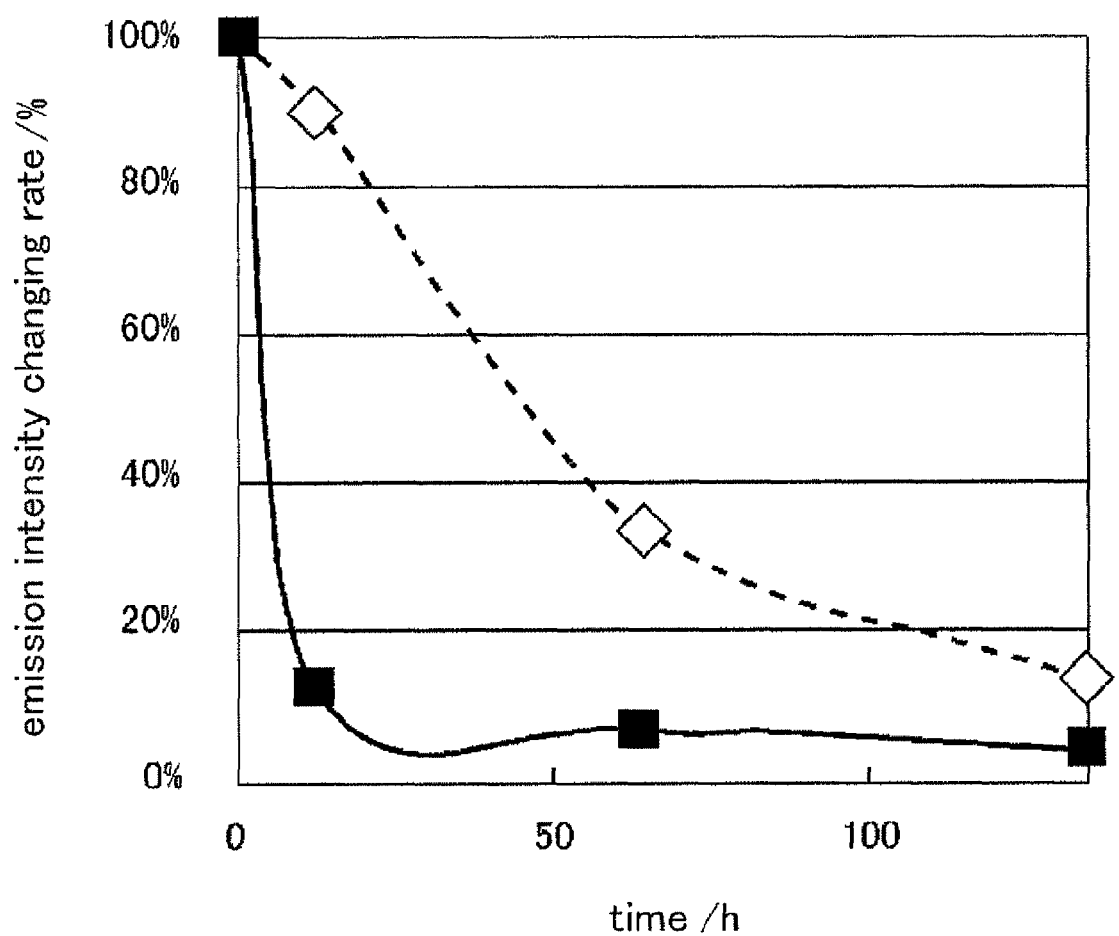
FIG. 1 is a graph showing omission intensity changing rates of a sulfide phosphor comprising ZnS-based sulfide salt not coated with coating material and a silicate-based oxide phosphor not coated with coating material.
Figure 2:
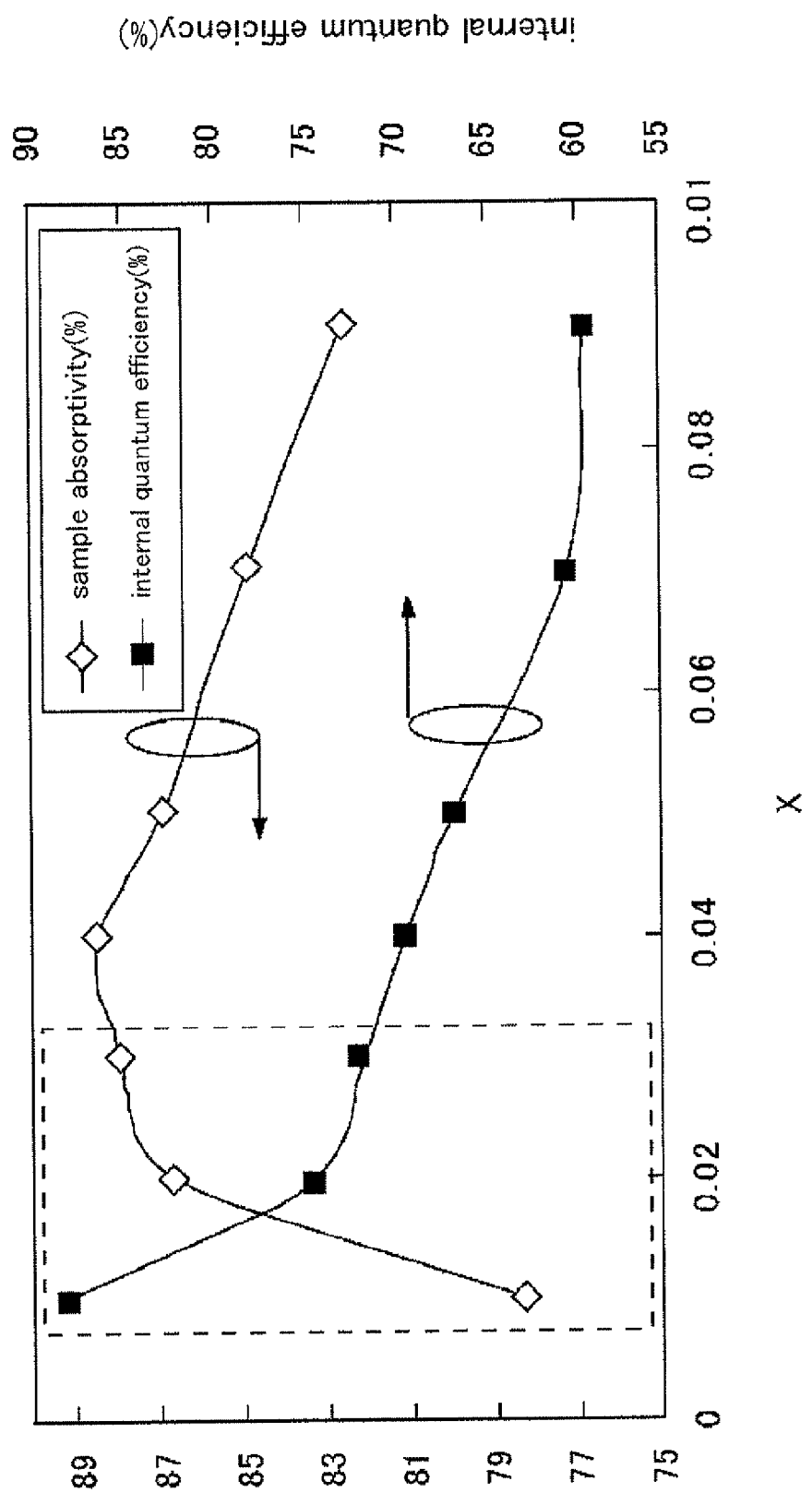
FIG. 2 is a graph showing a relationship between Eu concentrations and luminous efficiencies.

FIG. 2 is a graph showing a relationship between Eu concentrations and luminous efficiencies. As shown in FIG. 2, it is preferable for the phosphor to satisfy the relationship: $0.02 \leq$ the Europium concentration $(x) \leq 0.03$. This range of the Europium concentration increases sample absorptivity along with internal quantum efficiency, thereby improving the luminous efficiency of the phosphor.

Compared with sulfide phosphors, however, the phosphors shown in compositional formula (1) are inherently sensitive to moisture such that their luminous efficiencies will remarkably decrease due to degradation caused by moisture. Consequently, it is not obvious whether the method wherein a silicate-based oxide phosphor is coated with a coating material can prevent degradation caused by moisture and keep luminous efficiency in long time when applied to the phosphors shown in compositional formula (1). By contrast, a method for manufacturing 3 coated phosphor according to the present invention can provide a coated phosphor in which a phosphor is sufficiently coated with a coating material to prevent degradation of the phosphor caused by moisture, as described below.

The phosphor preferably has a specific surface area equal to or more than 2 m²/g, and more preferably, equal to or more than 4 m²/g. By using a phosphor having a specific surface area equal to or more than 2 m²/g, the coating material will be settled on the phosphor more stably, so that the coating material surely covering the phosphor will effectively prevent degradation of the phosphor caused by moisture. Accordingly, the luminous efficiency of the phosphor will be kept in longer time. Moreover, by using a phosphor having a specific surface area equal to or more than 4 m²/g, the coating material more surely covering the phosphor will more effectively prevent degradation of the phosphor caused by moisture. Accordingly, the luminous efficiency of the phosphor will be kept in longer time.

(Mixing Step)

In the mixing step, a phosphor and a coating material are mixed within a solvent to formed a mixed solution, such that the coating material is hydrolyzed in the mixed solution to cause sol-gel reaction, thereby obtaining a coated phosphor in which the phosphor is coated with the coating material. In other words, the mixed solution in dispersion state wherein the phosphor is coated with the coating material is made by sol-gel method.

Materials having a certain transparency against light in wavelength range to be used can be employed as the coating material. Such materials include oxides such as silica, titania, ceria and yttria, double oxides such as barium titanate and strontium titanate, and fluorides such as calcium fluoride and magnesium fluoride. A coring material of silica can be made by sol-gel method using alkylsilane compounds such as tetraethoxysilane and tetramethoxysilane.

Any solvent including water and organic solvent can he used as long as it can achieve uniform dispersion. Organic solvent which can be used may include, but is not limited to, alcohol, ether, ketone and polyhydric alcohol. Alcohol may include, but is not limited to, methanol, ethanol, propanol and pentanol. Polyhydric alcohol may include, but is not limited to, ethylene glycol, propylene glycol and diethylene glycol. Among these, using alcohol is preferable from the viewpoint of reaction rate control and using ethanol is more preferable. It should be noted that organic solvent may he used solely or in combination.

The mass ratio of the phosphor to the coating material is 40:260 to 200:260. The mass ratio of the phosphor to the coating material being 40:260 to 200:260 will prevent that parts of the coating material from aggregate together so that they are difficult to adhere to the phosphor and thus the coating material cannot coat the phosphor sufficiently.

It is more preferable that the mass ratio of the phosphor to the coating material is 50:260 to 100:260. The mass ratio of the phosphor to the coating material being 50:260 to 100:260 will effectively prevent degradation of the phosphor caused by moisture.

In the mixing step, when mixing the phosphor and the coating material in the solvent, they are preferably mixed at a stirring rotation speed of 600 rpm or more. As stated above, since the mass ratio of the phosphor to the coating material is 40:260 to 200:260, larger amount of the coating material requires more effective dispersion thereof. By mixing them at a stirring rotation speed of 600 rpm or more, the coating material is effectively dispersed so that the phosphor is sufficiently coated with the coating material and thus degradation of the phosphor caused by moisture is effectively prevented.

In the mixing step, in order to hydrolyze the coating material within the mixed solution, a solvent, such as water and ammonia, is added into the mixed solution. In the case of adding water as the solvent to the mixed solution, preferable addition amount of water relative to 1 mol of tetraethoxysilane (TEOS) is 4 mol or more. The water addition amount of 4 mol or more relative to 1 mol of TEOS sufficiently hydrolyze the coating material such that a coated phosphor sufficiently coated with the coating material can be obtained.

In the mixing step, the reaction temperature for mixing the phosphor and the coating material within the solvent is preferably 40 to 70° C. By mixing the phosphor and the coating material within the solvent at a temperature of 40 to 70° C., the phosphor can be sufficiently coated with the coating material, thereby effectively preventing degradation of the phosphor caused by moisture.

In the mixing step, the time for mixing the phosphor and the coating material is preferably 25 minutes or more. By mixing the phosphor and the coating material for 25 minutes or more, the phosphor can be sufficiently coated with the coating material and thus degradation of the phosphor caused by moisture is effectively prevented.

(Separation Step)

In the separation step, by separating the mixed solution obtained in the mixing step into the solid phase and the liquid phase, the coated phosphor in solid state can be obtained from the mixed solution.

An exemplary method for separating the mixed solution into a solid phase and a liquid phase is a method using a suction filter.

The method for manufacturing a coated phosphor according to an embodiment of the present invention can provide an excellent coated phosphor containing no residual unreacted reagent since the mass ratio of the phosphor to the coating material is 40:260 to 200:260 as explained above. Consequently, repetition of cleaning in order to remove residual unreacted reagent in the resulting coated phosphor is not necessary and thus the time from the reaction of the phosphor and the coating material to the completion of the coated phosphor can be reduced.

In addition, the coated phosphor provided by the method for manufacturing a coated phosphor according to an embodiment of the present invention is obtained by separating the mixed solution, in which a phosphor and a coating material are mixed within a solvent, into a solid phase and a liquid phase, and contains barium (Ba), strontium (Sr), europium (Eu), silicon (Si) and oxygen (O) at an atomic ratio represented by compositional formula (1). The mass ratio of the phosphor to the coating material is 40:260 to 200:260. The phosphor, therefore, is sufficiently coated with the coating material within a mixed solution in which the phosphor and the coating material is mixed in a solvent and thus degradation of the phosphor caused by moisture is effectively prevented. Accordingly, luminous efficiency of the phosphor can be kept in long time.

Furthermore, this manufacturing method for a coated phosphor provides a coated phosphor in which a phosphor is sufficiently coated with a coating material by setting the mess ratio of the phosphor to the coating material to be 40:260 to 200:260. This prevents strontium (Sr) and barium (Ba) constituting the coated phosphor from leaking as $Sr^{2+}$ and $Ba^{2+}$ from the coated phosphor to outside. In addition, the coated phosphor provided by the method for manufacturing a coated phosphor according to an embodiment of the present invention preferably has an electric conductance of 400 ms/m or less when immersed in the solvent. This conductance of 400 ms/m or less of the coated phosphor when immersed in the solvent prevents leakage of strontium (Sr) and barium (Ba) constituting the coated phosphor from the coated phosphor to outside. In other words, the coated phosphor in which the phosphor is sufficiently coated with the coating material is obtained by setting the electrical conductance of the coated phosphor when immersed in the solvent to be 400 ms/m or less. As explained hereinabove, the coated phosphor provided by the method for manufacturing a coated phosphor according to an embodiment of the present invention sufficiently coats the phosphor with the coating material thereby preventing degradation of the phosphor caused by moisture and keeping luminous efficiency of the phosphor in long time.

EXAMPLES

Examples of the present invention will be described. In these examples, quantum efficiencies, integrated values of luminescence amount, peak intensities (luminescence intensities) and peak wavelengths of phosphors are evaluated. In should be rioted that the present invention is not limited to these examples.

[Manufacturing Method of Coated Phosphor]

(Sample 1)

In sample 1, 25 g of phosphor containing barium (Ba), strontium (Sr), europium (Eu), silicon (Si) and oxygen (O) at an atomic ratio represented by above compositional formula (1) was used (specific surface area of 5.047 ($m^2$/g), made by Sony Chemical and Information Device Corporation). In addition, 260 g of TEOS (made by Kanto Chemical co., inc.) was used as the coating material.

After weighing the phosphor, coating material and ethanol (183 ml), the weighed phosphor, coating material and ethanol were stirred in a vessel made of polyethylene (PE) at a stirring rotation speed of 600 rpm to obtain a mixed solution of the phosphor, coating material and ethanol. After settling the mixed solution in the vessel at a constant temperature of 55° C., 4 mol of pure water relative to 1 mol of TEOS was added to the mixed solution being stirred at the constant speed to cause sol-gel reaction. The mixed solution were separated into powders of the phosphor (solid phase) and a solution (liquid phase) by using a suction filter 60 minutes after the addition of the pure water into the vessel. Subsequently, after leaving the phosphor powders in an oven at 85° C. for two hours in order to dry them, they were burnt in an oven at 200° C. for two hours. The powders of the coated phosphor in which the phosphor is coated with the coating material were thus obtained by sol-gel method.

(Sample 2)

In sample 2, powders of the coated phosphor were obtained by processes similar to sample 1 except that the addition amount of the phosphor was 50 g.

(Sample 3)

In sample 3, powders of the coated phosphor were obtained by processes similar to sample 1 except that the addition amount of the phosphor was 60 g.

(Sample 4)

In sample 4, powders of the coated phosphor were obtained by processes similar to sample 1 except that the addition amount of the phosphor was 100 g.

(Sample 5)

In sample 5, powders of the coated phosphor were obtained by processes similar to sample 1 except that the addition amount of the phosphor was 225 g.

(Sample 6)

In sample 6, powders of the coated phosphor were obtained by processes similar to sample 1 except that the phosphor, coating material and ethanol were mixed at a stirring rotation speed of 100 rpm.

(Sample 7)

In sample 7, powders of the coated phosphor were obtained by processes similar to sample 1 except that the phosphor, coating material and ethanol were mixed at a stirring rotation, speed of 800 rpm.

(Sample 8)

In sample 8, powders of the coated phosphor were obtained by processes similar to sample 1 except that 2 mol of pure water relative to 1 mol of TEOS was added to the mixed solution being stirred.

(Sample 9)

In sample 9, powders of the coated phosphor were obtained by processes similar to sample 1 except that 6 mol of pure water relative to 1 mol of TEOS was added to the mixed solution being stirred.

(Sample 10)

In sample 10, powders of the coated phosphor were obtained by processes similar to sample 1 except that pure water was added to the mixed solution being stirred after settling the mixed solution in the vessel at a constant temperature of 45° C.

(Sample 11)

In sample 11, powders of the coated phosphor were obtained by processes similar to sample 1 except that pure water was added to the mixed solution being stirred after settling the mixed solution in the vessel at a constant temperature of 65° C.

(Sample 12)

In sample 12, powders of the coated phosphor were obtained by processes similar to sample 1 except that mixed solution were separated into phosphor powders and a solution by using a suction filter 30 minutes after the addition of the pure water into the vessel.

(Sample 13)

In sample 13, powders of the coated phosphor were obtained by processes similar to sample 1 except that mixed solution were separated into phosphor powders and a solution by using a suction filter 120 minutes after the addition of the pure water into the vessel.

(Sample 14)

In sample 14, powders of the coated phosphor were obtained by processes similar to sample 1 except that a phosphor having a specific surface area of 1.108 ($m^2$/g) was used.

(Sample 15)

In sample 15, a phosphor having a specific surface area of 1.816 ($m^2$/g) and not coated with the coating material was used.

(Sample 16)

In sample 16, a phosphor having a specific surface area of 5.047 ($m^2$/g) and not coated with the coating material was used.

The conditions of sample 1 to 16 are summarized in the following table 1.

[Evaluation of Coated Phosphor]

(Luminous Intensity Maintenance Rate)

Luminous intensity maintenance rates of samples 1 to 16 were calculated based on luminous intensities of respective samples before and after leaving each sample under an environment of 60° C. and 90% RH for 500 hours. The luminous intensities of the phosphors were measured by illuminating them with excitation light having a wavelength of 450 nm and using a spectrofluorometer FP-6500 (JASCO corporation). Moreover, quantum efficiencies of the phosphors were calculated from fluorescence spectrums measured by filling the phosphor powders into a dedicated cell and illuminating them with blue excitation light having a wavelength of 450 nm.

(Addition Amount of Powders)

Figure 3:
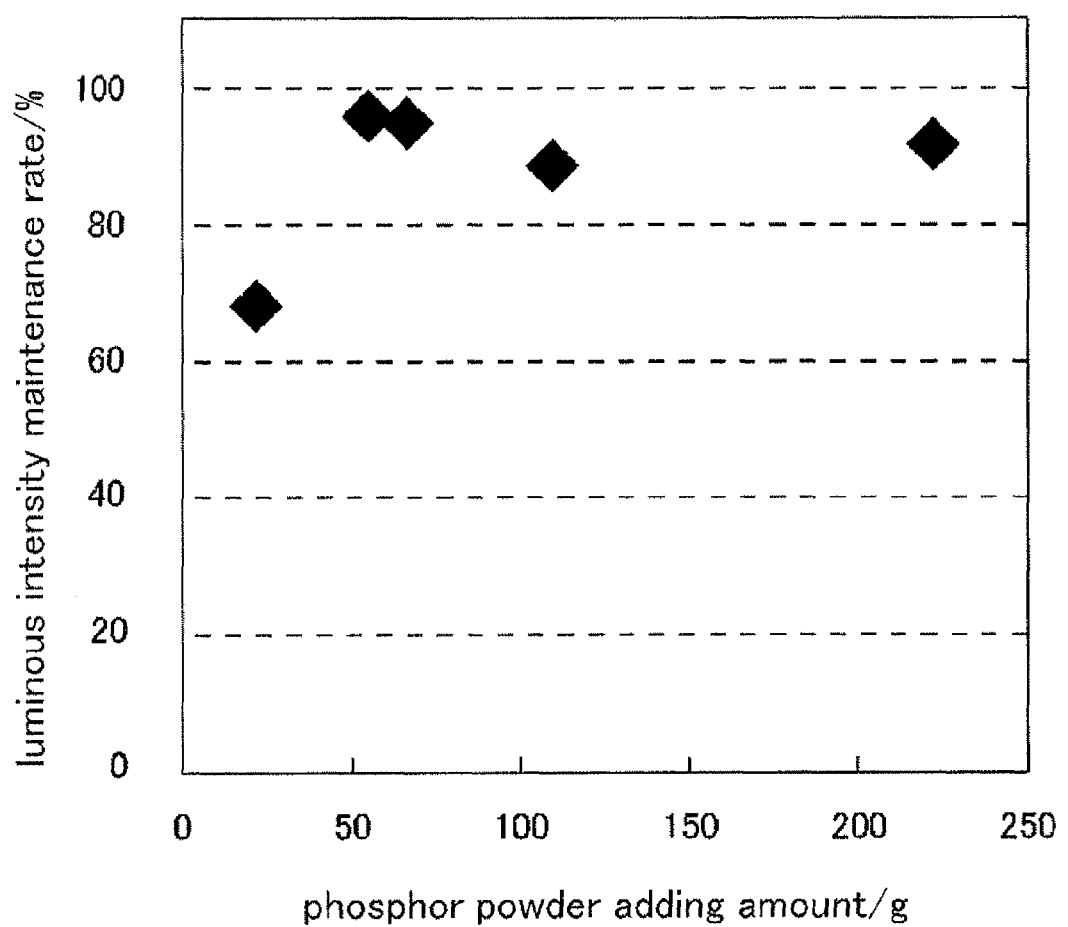
FIG. 3 is a graph showing a relationship between the mass ratios of the phosphor to the coating material, and luminous intensity maintenance rates of the coated phosphors.

FIG. 3 is a graph showing a relationship between the mass ratios of the phosphor to the coating material, and the luminous intensity maintenance rates of the coated phosphors of samples 1 to 5. As shown in FIG. 3, samples 2 to 5 having the mass ratio of the phosphor to the coating material of 40:260 to 200:260 were evaluated to have excellent luminous intensity maintenance rates relative to sample 1 (the mass ratio of the phosphor to the coating material being 25:260) since the phosphors were surely coated with the coating materials in samples 2 to 5. In addition, samples 2 to 4 having the mass ratio of the phosphor to the coating material of 50:260 to 100:260 were evaluated to have more excellent luminous intensity maintenance rates since the phosphors were more surely coated with the coating materials.

(Stirring Rotation Speed)

Figure 4:
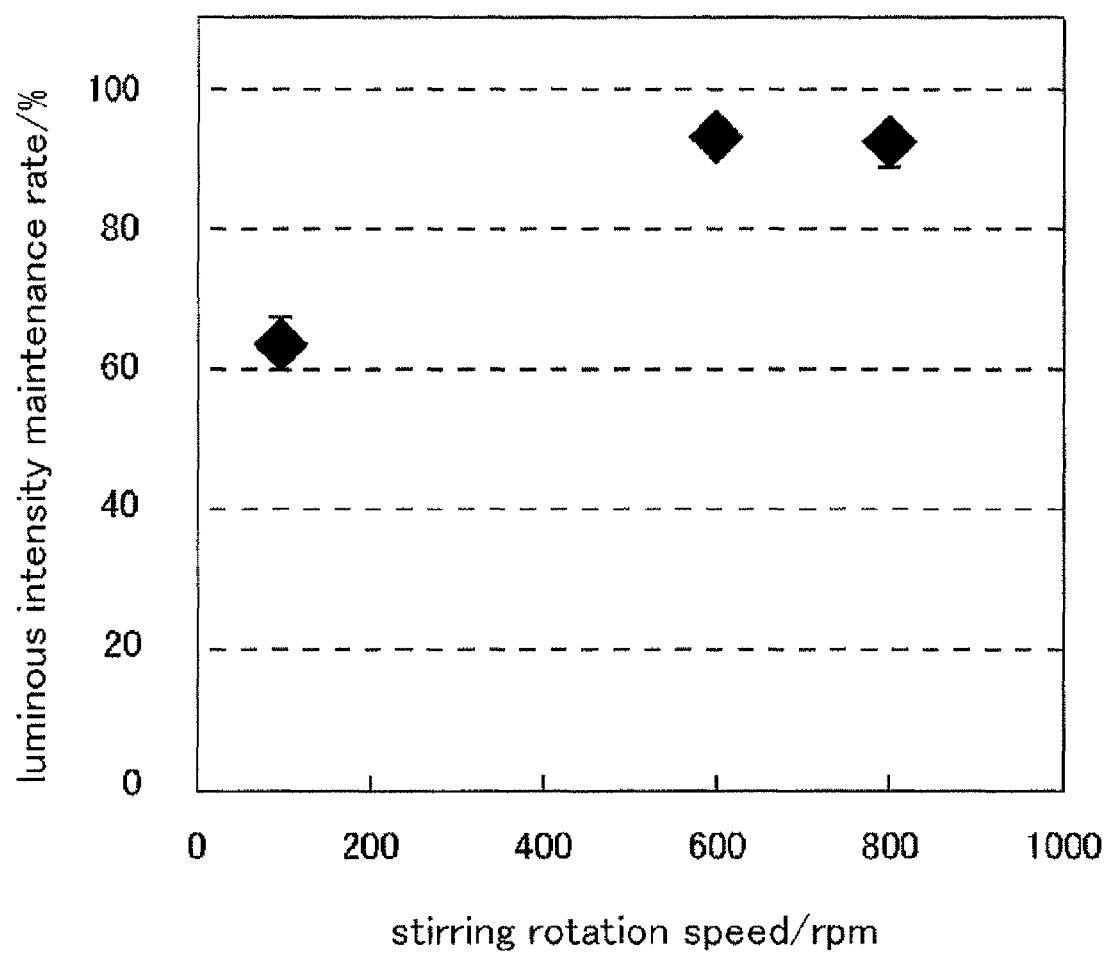
FIG. 4 is a graph showing a relationship between stirring rotation speeds in mixing steps and luminous intensity maintenance rates.

FIG. 4 is a graph showing a relationship between the stirring rotation speeds in the mixing steps and the luminous intensity maintenance rates of the coated phosphors of sample 3 (stirring rotation speed of 600 rpm), sample 6 (stirring rotation speed of 100 rpm) and sample 7 (stirring rotation speeds of 800 rpm). As shown in FIG. 4, samples 3 and 7 wherein the stirring rotation speeds were 600 rpm or more were evaluated to have excellent luminous intensity maintenance rates relative to sample 6 wherein the stirring rotation speed was less than 600 rpm since the coating materials were effectively dispersed and the phosphors were surely coated with the coating materials in samples 3 and 7.

(Addition Amount of H2O)

Figure 5:
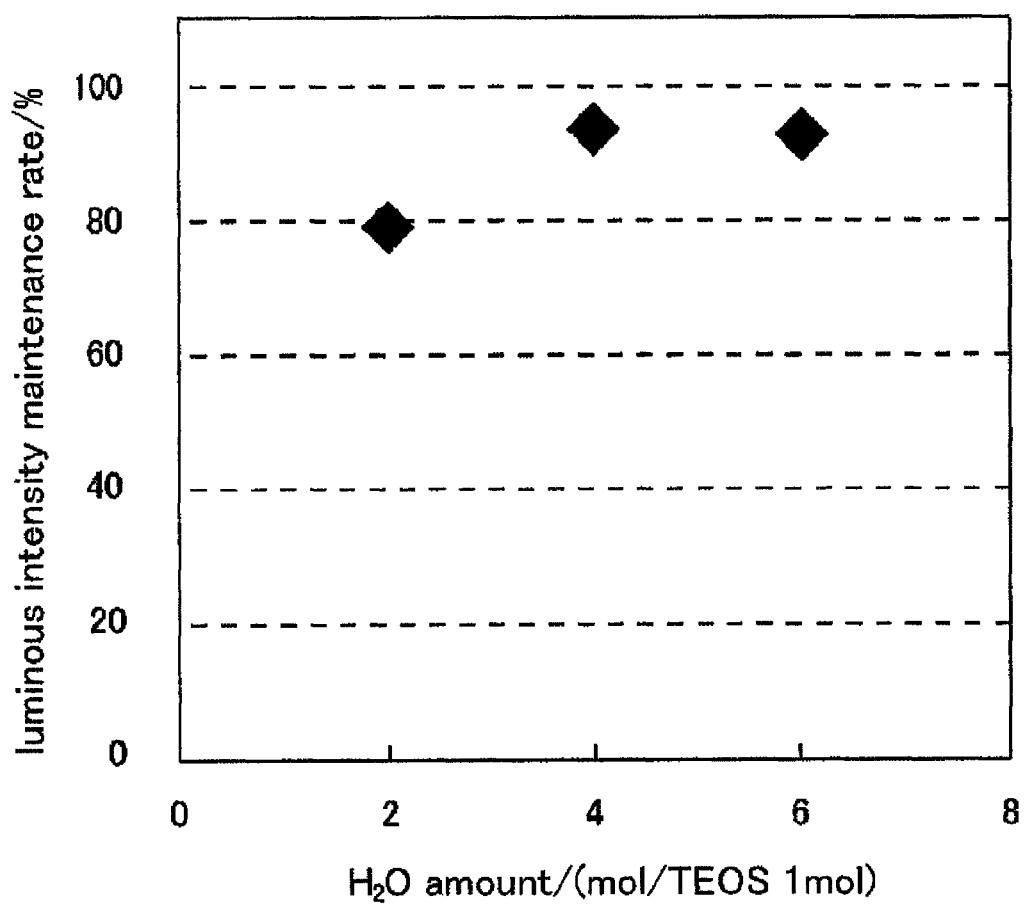
FIG. 5 is a graph showing a relationship between water addition amounts in mixing steps and luminous intensity maintenance rates.

FIG. 5 is a graph showing a relationship between the water addition amounts in the mixing steps and the luminous inten-

TABLE 1

|  | specific surface area of phosphor ($m^2$/g) | powder addition amount (g) | TEOS amount (g) | stirring rotation speed (rpm) | $H_2O$ addition amount (mol/TEOS 1 mol) | reaction temperature (° C.) | reaction time (min) |
|---|---|---|---|---|---|---|---|
| sample 1 | 5.047 | 25 | 260 | 600 | 4 | 55 | 60 |
| sample 2 | 5.047 | 50 | 260 | 600 | 4 | 55 | 60 |
| sample 3 | 5.047 | 60 | 260 | 600 | 4 | 55 | 60 |
| sample 4 | 5.047 | 100 | 260 | 600 | 4 | 55 | 60 |
| sample 5 | 5.047 | 225 | 260 | 600 | 4 | 55 | 60 |
| sample 6 | 5.047 | 60 | 260 | 100 | 4 | 55 | 60 |
| sample 7 | 5.047 | 60 | 260 | 800 | 4 | 55 | 60 |
| sample 8 | 5.047 | 60 | 260 | 600 | 2 | 55 | 60 |
| sample 9 | 5.047 | 60 | 260 | 600 | 6 | 55 | 60 |
| sample 10 | 5.047 | 60 | 260 | 600 | 4 | 45 | 60 |
| aample 11 | 5.047 | 60 | 260 | 600 | 4 | 65 | 60 |
| sample 12 | 5.047 | 60 | 260 | 600 | 4 | 55 | 30 |
| sample 13 | 5.047 | 60 | 260 | 600 | 4 | 55 | 120 |
| sample 14 | 1.108 | 60 | 260 | 600 | 4 | 55 | 60 |
| sample 15 | 1.816 | 60 | 0 | — | — | — | — |
| sample 16 | 5.047 | 60 | 0 | — | — | — | — | sity maintenance rates of the coated phosphors of sample 3 (water addition amount being 4 mol relative to 1 mol of TEOS), sample 8 (water addition amount being 2 mol relative to 1 mol of TEOS) and sample 9 (water addition amount being 6 mol relative to 1 mol of TEOS). From FIG. 5, it was revealed that the luminous intensity maintenance rates improved in proportion to the water addition amounts. Furthermore, the samples 3 and 9 wherein the water addition amounts were 4 mol or more relative to 1 mol of TEOS were evaluated to have particularly excellent luminous intensity maintenance rates since the phosphors were sufficiently coated with sufficiently hydrolyzed coating materials.

(Reaction Temperature)

Figure 6:
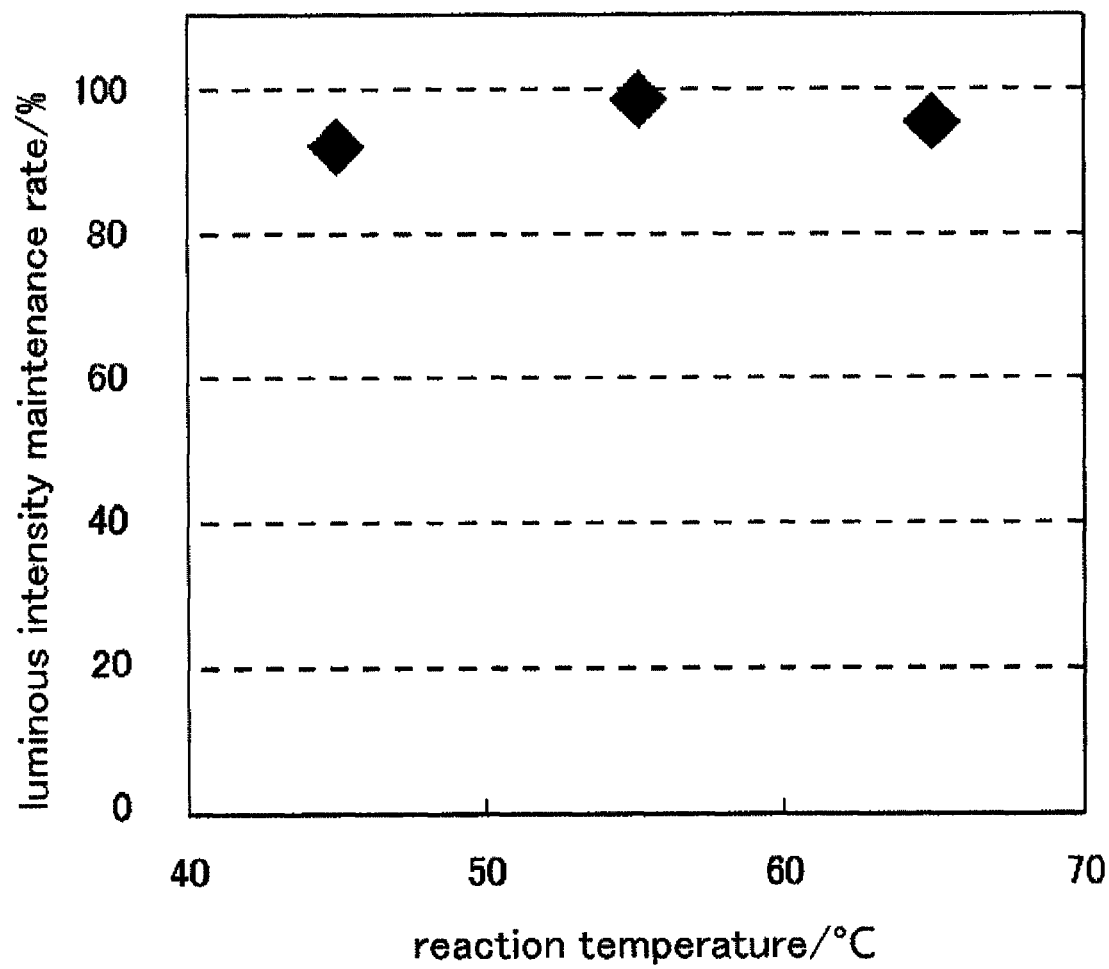
FIG. 6 is a graph showing a relationship between reaction temperatures for phosphors and coating materials in mixing steps and luminous intensity maintenance rates.

FIG. 6 is a graph showing a relationship between reaction temperatures for the phosphors and the coating materials in the mixing steps and the luminous intensity maintenance rates of the coated phosphors of sample 3 (reaction temperature being 55° C.), sample 10 (reaction temperature being 45° C.) and sample 11 (reaction temperature being 65° C.). As shown in FIG. 6, the samples 3, 10 and 11 wherein the reaction temperatures were in a range of 40 to 70° C. were evaluated to have excellent luminous intensity maintenance rates since the phosphors were coated with coating materials. Among them, sample 3 wherein the reaction temperature was 55° C. was evaluated to have a particularly excellent luminous intensity maintenance rate.

(Reaction Time)

Figure 7:
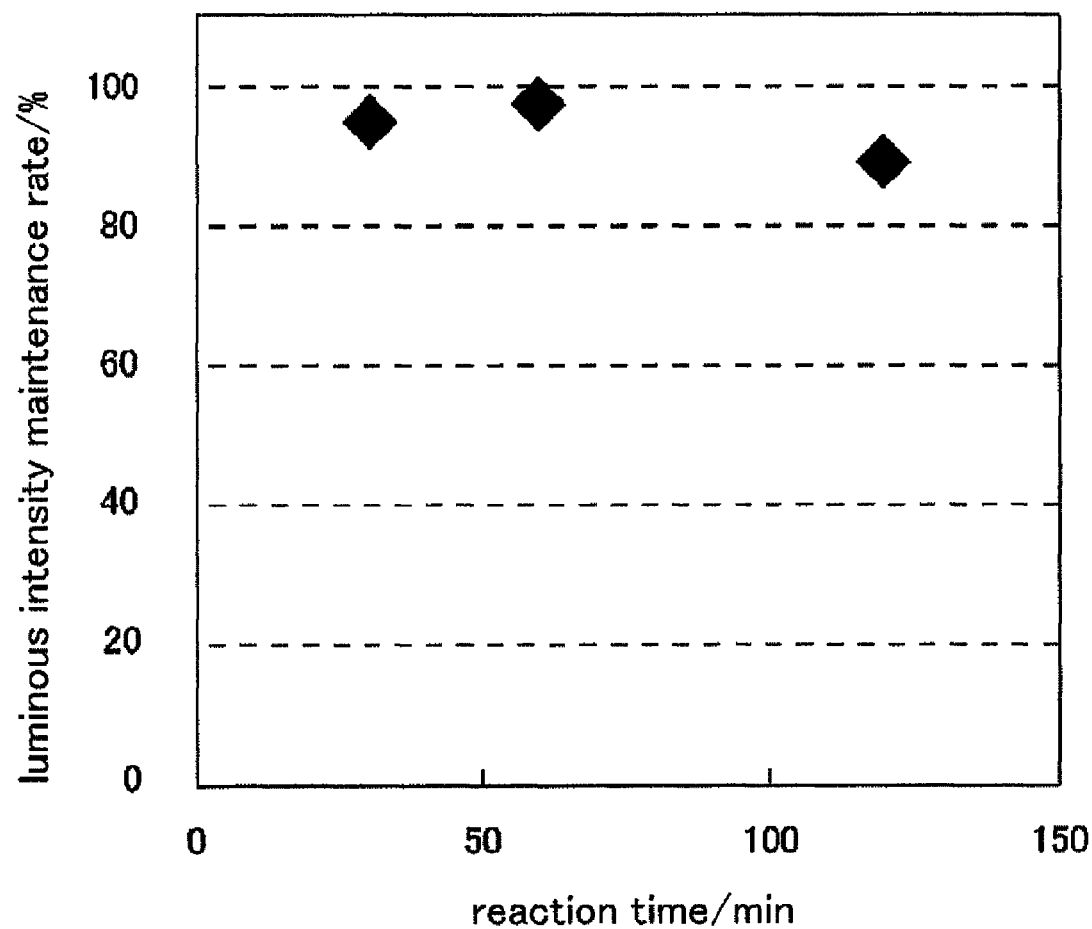
FIG. 7 is a graph showing a relationship between reaction times for phosphors and coating materials in mixing steps and luminous intensity maintenance rates.

FIG. 7 is a graph showing a relationship between reaction times for the phosphors and the coating materials in the mixing steps and the luminous intensity maintenance rates of the coated phosphors of sample 3 (reaction time being 60 minutes), sample 12 (reaction time being 30 minutes) and sample 13 (reaction time being 120 minutes). As shown in FIG. 7, the samples 3, 12 and 13 wherein the reaction times were 20 minutes or more were evaluated to have excellent luminous intensity maintenance rates since the phosphors were coated with coating materials. Among them, sample 3 was evaluated to have a particularly excellent luminous intensity maintenance rate. These results reveal that a coated phosphor having an excellent luminous intensity maintenance rate can be obtained in a short period of time of around 60 minutes.

(Specific Surface Area)

Figure 8:
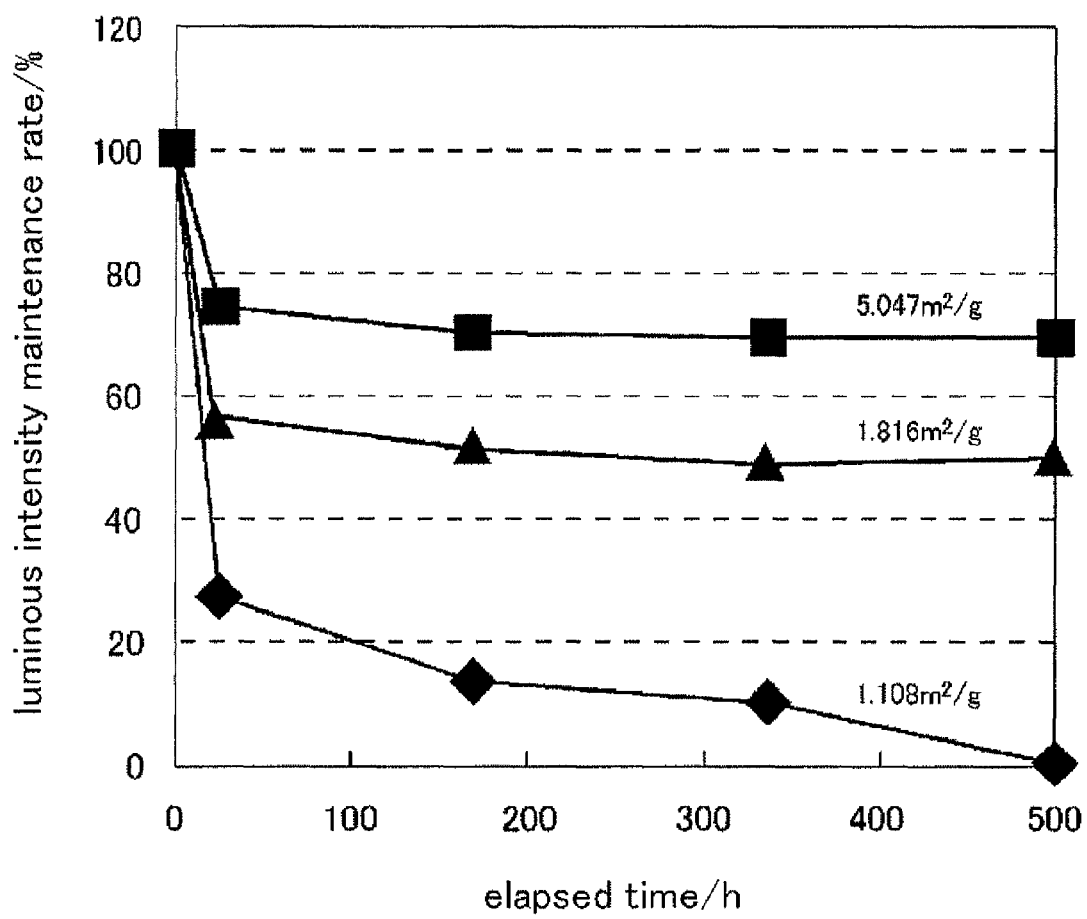
FIG. 8 is a graph showing a relationship between specific surface areas of phosphors and luminous intensity maintenance rates before coating process.

FIG. 8 is a graph showing a relationship between the specific surface areas of the phosphors and the luminous intensity maintenance rates of the coated phosphors of sample 3 (specific surface areas being 5.047 $m^2$/g), sample 14 (specific surface areas being 1.108 $m^2$/g) and sample 15 (specific surface areas being 1.816 $m^2$/g) before coating process (surface process). FIG. 8 reveals that the luminous intensity maintenance rates will be changed by the difference of the specific surface areas of the phosphors. In particular, it reveals that the specific surface areas of 2 $m^2$/g or more is preferable and the specific surface areas of 4 $m^2$/g or more is more preferable.

Figure 9:
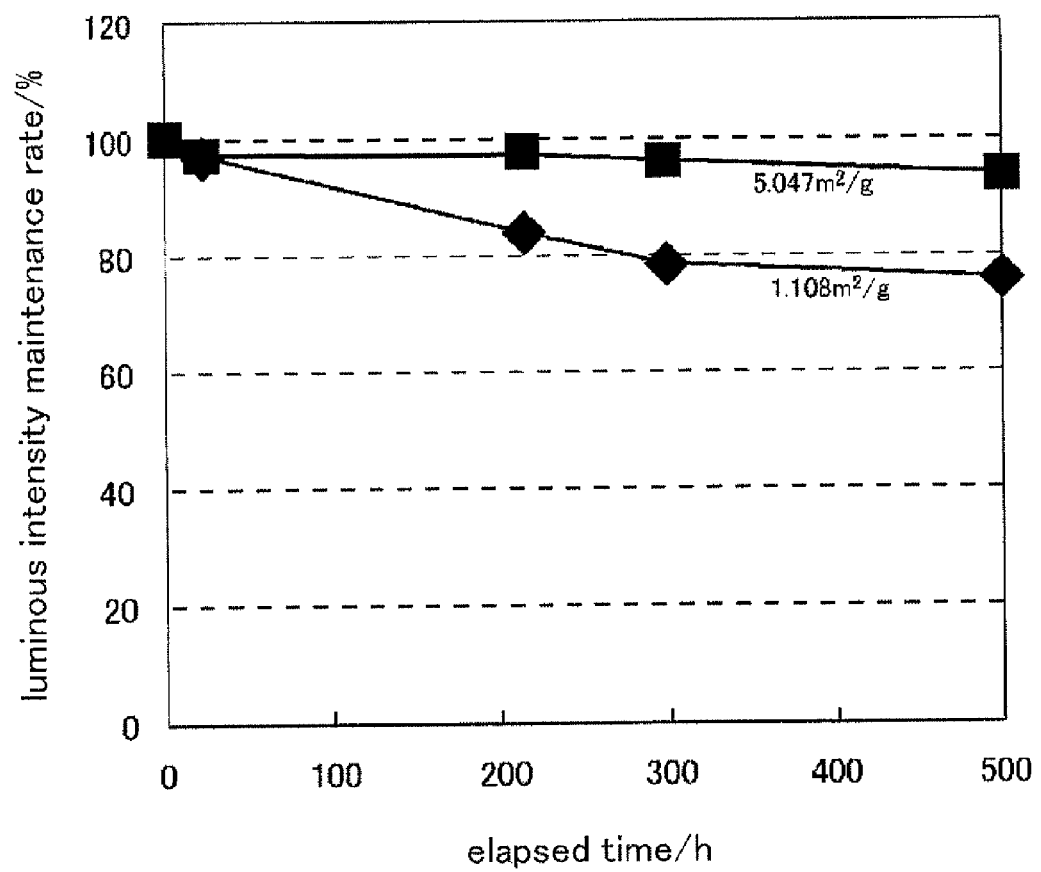
FIG. 9 is a graph showing a relationship between specific surface areas of phosphors and luminous intensity maintenance rates after coating process.

FIG. 9 is a graph showing a relationship between the specific surface areas of the phosphors and the luminous intensity maintenance rates of the coated phosphors of sample 3 and sample 14 after coating process. As shown in FIG. 9, compared with samples before coating process, the luminous intensity maintenance rates of samples 3 and 14 were improved. In addition, the sample 3 having a specific surface area larger than that of sample 14 had a luminous intensity maintenance rate better than that of sample 14 since the phosphor was surely coated with the coating material.

Figure 10:
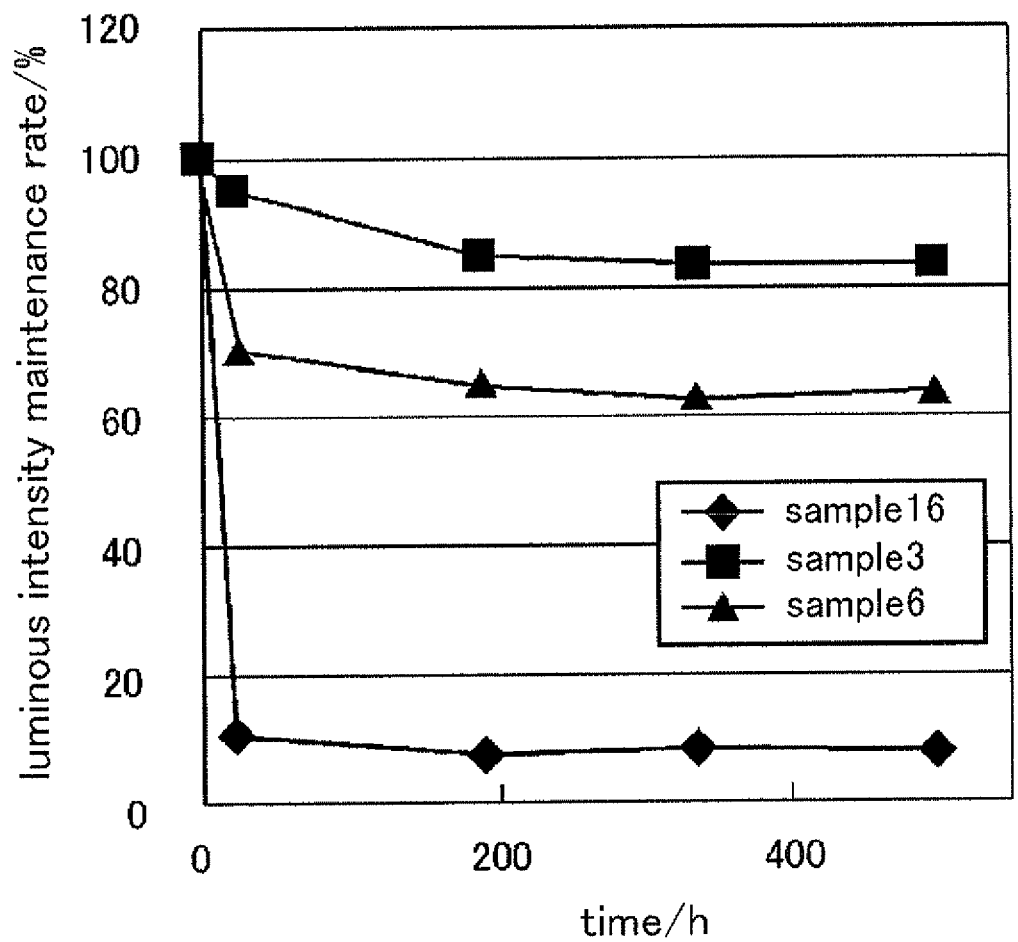
FIG. 10 is a graph showing changes of the luminous intensity maintenance rates over time.

FIG. 10 is a graph showing changes of the luminous intensity maintenance rates of samples 3, 6 and 16 over time.

As shown in FIG. 10, in the case of uncoated sample 16, the luminous intensity maintenance rate after leaving the phosphor under an environment of 60° C. and 90% RH for 500 hours was around 10%. On the other hand, in the case of coated sample 6, the luminous intensity maintenance rate after leaving the phosphor under an environment of 60° C. and 90% RH for 500 hours was kept to around 60%. In the case of coated sample 3, the luminous intensity maintenance rate after leaving the phosphor under an environment of 60° C. and 90% RH for 500 hours was kept to around 85%. These results reveal that the conditional setting of the coating process is important for excellent luminous intensity maintenance rate.

(Luminous Efficiency)

Figure 11:
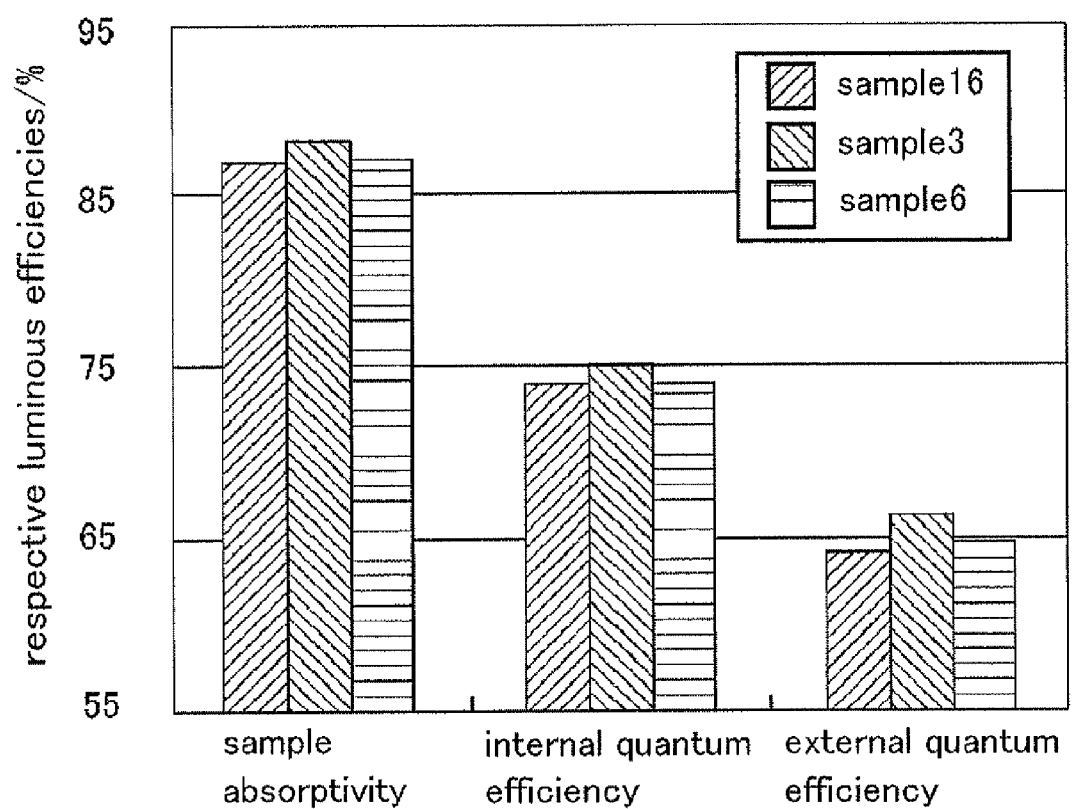
FIG. 11 is a graph showing luminous efficiencies.

FIG. 11 is a graph showing the luminous efficiencies of samples 3, 6 and 16. It should be noted that the luminous efficiencies of phosphors can be expressed by three types of efficiencies: efficiency of absorbing excitation light (absorptivity), efficiency of converting the absorbed excitation light into fluorescent light (internal quantum efficiency) and efficiency of converting the excitation light into fluorescent light expressed by the product of absorptivity and internal quantum efficiency (external quantum efficiency). Among them, external quantum efficiency is important. From FIG. 11, it could be confirmed that the coated samples 3 and 6 had increased luminous efficiencies compared with the uncoated sample 16. That is, it was confirmed that the coating process would improve luminous efficiency in view of all of sample absorptivity, internal quantum efficiency and external quantum efficiency.

Figure 12:
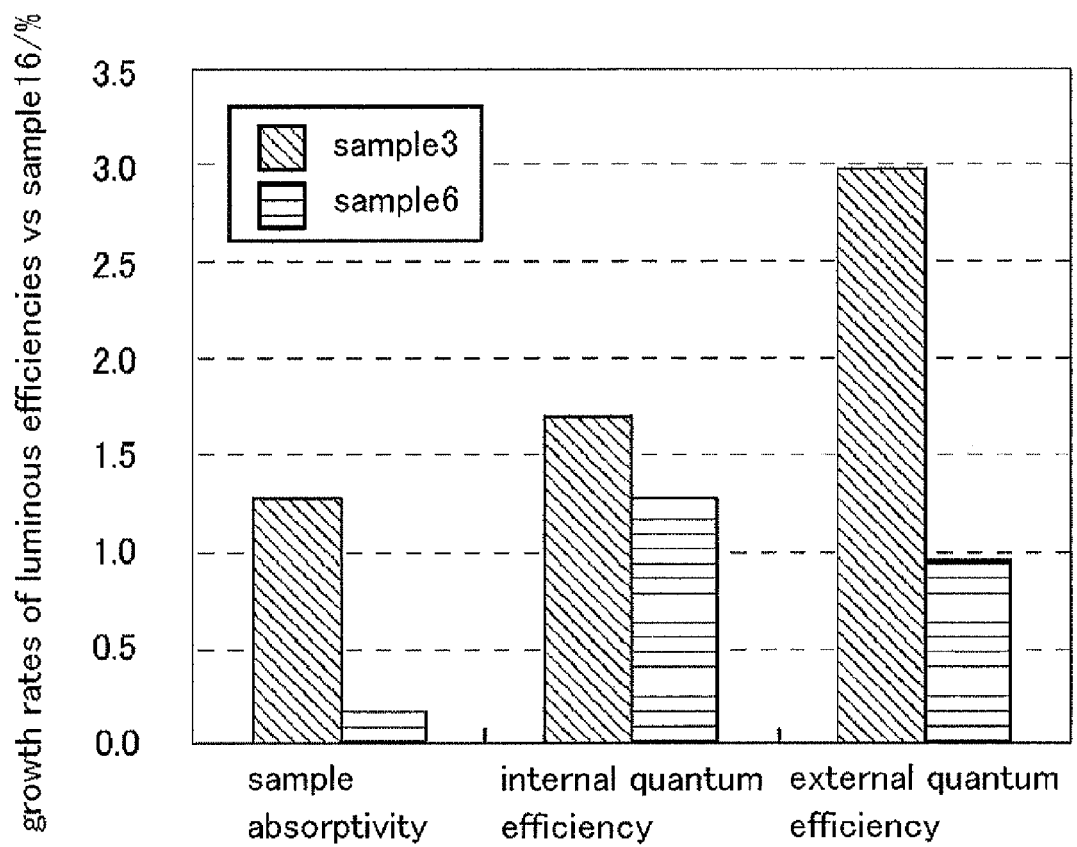
FIG. 12 is a graph showing growth rates of luminous efficiencies.

FIG. 12 is a graph showing growth rates of the luminous efficiencies of samples 3 and 6 relative to sample 36. From FIG. 12, it was confirmed that sample 3 wherein the stirring rotation speed in the mixing step was 600 rpm or more had a growth rate of the luminous efficiency larger than that of sample 16 wherein the stirring rotation speed in the mixing step was less than 600 rpm.

(Reliability Test)

A reliability test was conducted by adding 5 g of the phosphor powders obtained in samples 3, 6 and 16, respectively, into 200 g of pure water at 55° C. and measuring electrical conductances thereof over time. Furthermore, the aqueous solution of samples 3 and 16 were separated into phosphor powders and supernatant liquid and then a quantitative analysis of dissolved substances was conducted upon the supernatant liquid by ICP-MS.

Figure 13:
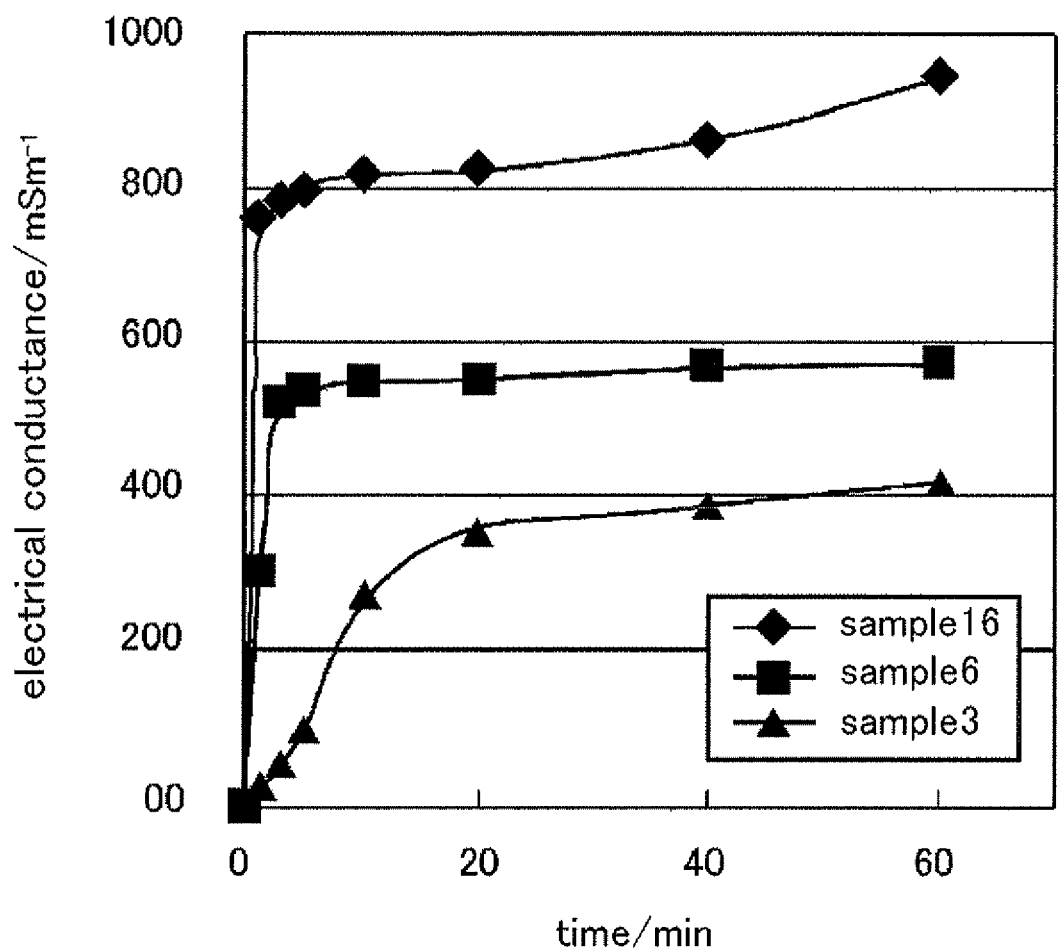
FIG. 13 is a graph showing changes of electrical conductances over time.

FIG. 13 is a graph showing changes of electrical conductances of samples 3, 6 and 16 over time. As shown in 13, comparing to the case of uncoated sample 16 wherein the electrical conductance 60 minutes after the powders were added into the pure water was 950 mS/m, it was confirmed that the case of coated sample 3 could suppress the electrical conductance 60 minutes after the powders were added into the pure water to be 400 mS/m. Moreover, it was confirmed that the coated sample 3 could suppress the electrical conductance better than the coated sample 6. These results reveal that sample 3 can suppress degradation of the coated phosphor better than the others.

Figure 14:
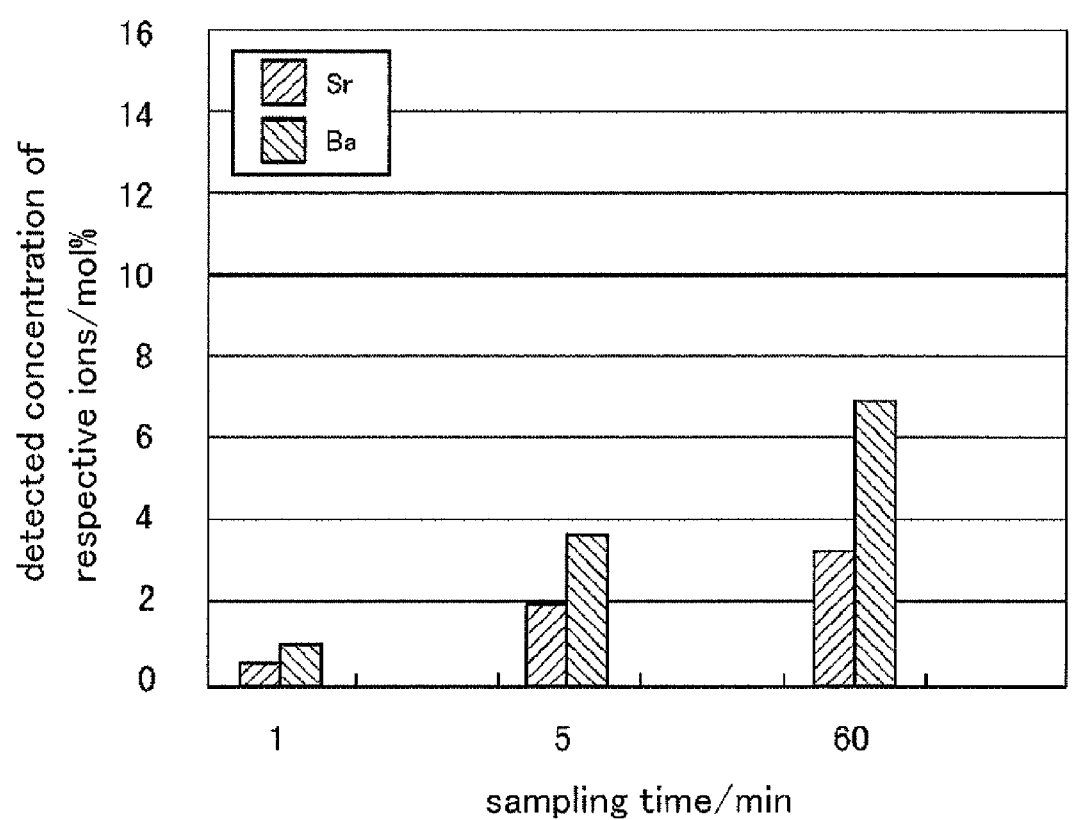
FIG. 14 is a graph showing a result of ICP-MS.
Figure 15:
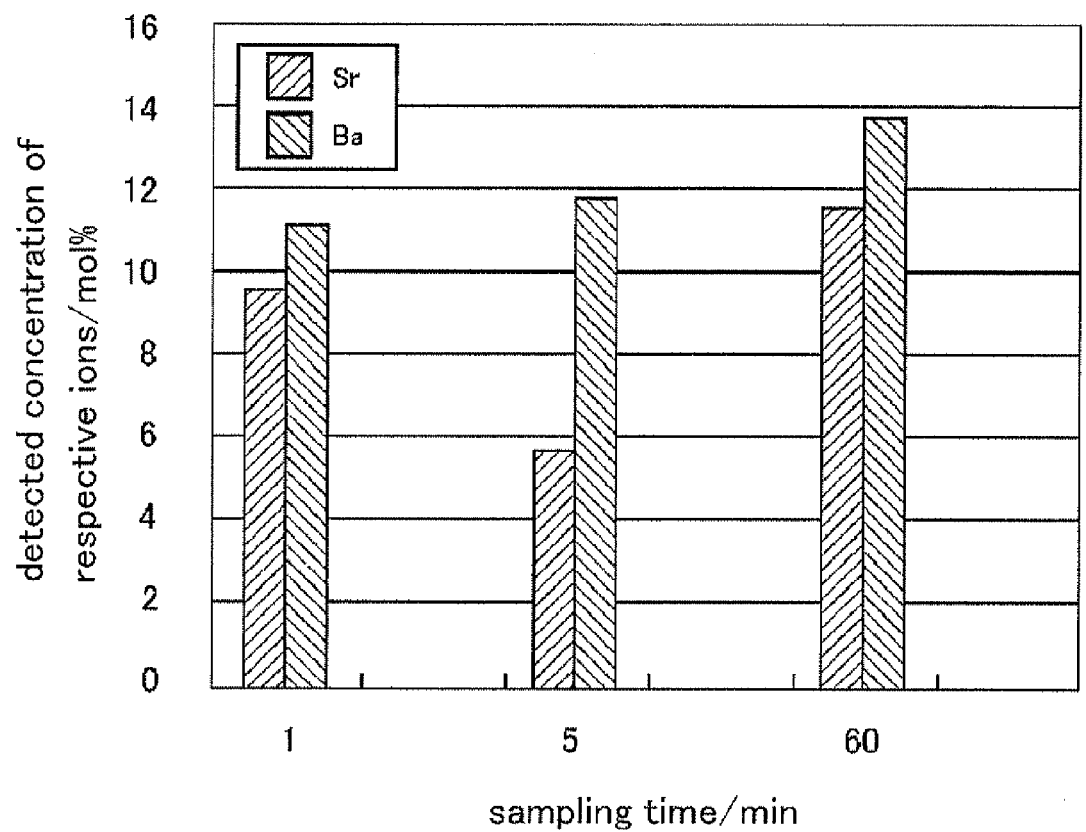
FIG. 15 is a graph showing a result of ICP-MS.

FIG. 14 is a graph showing the result of ICP-MS of sample 3. FIG. 15 is a graph showing the result of ICP-MS of sample 16. As shown in FIGS. 14 and 14, the dissolved substances in the supernatant liquid of each sample were $Sr^{2+}$ and $Ba^{2+}$. In addition, it was confirmed that coated sample 3 could suppress the dissolution of $Sr^{2+}$ and $Ba^{2+}$ from the phosphor powders better than uncoated sample 16.

These results reveal that coated sample 3 can suppress the dissolution of $Sr^{2+}$ and $Ba^{2+}$ better than uncoated sample 16. Moreover, it was confirmed that coated sample 3 did not require repetition of cleaning in order to remove residual unreacted reagent in the resulting coated phosphor. Furthermore, there was a correlation between the various electrical conductances and the concentrations of respective dissolved substances. That is, it was confirmed that the values of the electrical conductances correlated to the amount of $Sr^{2+}$ and $Ba^{2+}$ dissolved from the coated phosphors.

The invention claimed is:

1. A method for manufacturing a coated phosphor in which a phosphor is coated with a coating material comprising:
   a mixing step of mixing the phosphor with the coating material in a solvent to form a mixed solution; and
   a separation step of separating the mixed solution into a solid phase and a liquid phase, wherein
   the phosphor contains barium (Ba), strontium (Sr), europium (Eu), silicon (Si) and oxygen (O) at an atomic ratio represented by compositional formula (1), and
   the mass ratio of the phosphor to the coating material is 40:260 to 200:260, $$[(Ba_{1-y}Sr_y)_{1-x}Eu_x]_aSi_bO_c \qquad \text{compositional formula (1)}$$

wherein a, b, c, x and y satisfy the relationships: 2.7<a<3.3, 0.9<b<1.1, 4.5<c<5.5, 0<x<0.09 and 0.25<y<0.75,
   wherein the uncoated phosphor has a specific surface area equal to or more than 2 m2/g, and
the coating material is an alkylsilane compound.

2. The method for manufacturing a coated phosphor according to claim 1 wherein the uncoated phosphor has a specific surface area equal to or more than 4 m2/g.

3. The method for manufacturing a coated phosphor according to claim 1 wherein the mass ratio of the phosphor to the coating material is 50:260 to 100:260.

4. The method for manufacturing a coated phosphor according to claim 1 wherein the phosphor and the coating material are mixed in the mixing step at a stirring rotation speed of 600 rpm or more.

5. The method for manufacturing a coated phosphor according to claim 1 wherein the phosphor and the coating material are mixed in the mixing step at a reaction temperature of 40 to 70° C.

6. A method for manufacturing a coated phosphor in which a phosphor is coated with a coating material comprising:
   mixing the phosphor with the coating material in a solvent to form a mixed solution and separating the mixed solution into a solid phase and a liquid phase wherein,
   the phosphor contains barium (Ba), strontium (Sr), europium (Eu), silicon (Si) and oxygen (O) at an atomic ratio represented by compositional formula (1), and
   the coated phosphor has an electric conductance of 400 ms/m or less when immersed in the solvent, $$[(Ba_{1-y}Sr_y)_{1-x}Eu_x]_aSi_bO_c \qquad \text{compositional formula (1)}$$

wherein a, b, c, x and y satisfy the relationships: 2.7<a<3.3, 0.9<b<1.1, 4.5<c<5.5, 0<x<0.09 and 0.25<y<0.75,
   wherein the uncoated phosphor has a specific surface area equal to or more than 2 m2/g, and the coating material is an alkylsilane compound.

7. The method for manufacturing a coated phosphor according to claim 2 wherein the mass ratio of the phosphor to the coating material is 50:260 to 100:260.

8. The method for manufacturing a coated phosphor according to claim 2 wherein the phosphor and the coating material are mixed in the mixing step at a stirring rotation speed of 600 rpm or more.

9. The method for manufacturing a coated phosphor according to claim 3 wherein the phosphor and the coating material are mixed in the mixing step at a stirring rotation speed of 600 rpm or more.

10. The method for manufacturing a coated phosphor according to claim 6 wherein the uncoated phosphor has a specific surface area equal to or more than 4 m2/g.

11. The method for manufacturing a coated phosphor according to claim 6 wherein the phosphor and the coating material are mixed in the mixing step at a stirring rotation speed of 600 rpm or more.

12. The method for manufacturing a coated phosphor according to claim 6 wherein the phosphor and the coating material are mixed in the mixing step at a reaction temperature of 40 to 70° C.

* * * * *